United States Patent
Inao et al.

(10) Patent No.: US 10,081,316 B2
(45) Date of Patent: Sep. 25, 2018

(54) WIRE HARNESS

(71) Applicant: Yazaki Corporation, Minato-ku, Tokyo (JP)

(72) Inventors: Shinichi Inao, Makinohara (JP); Hideomi Adachi, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/974,014

(22) Filed: Dec. 18, 2015

(65) Prior Publication Data

US 2016/0101747 A1 Apr. 14, 2016

Related U.S. Application Data

(63) Continuation of application No. PCT/JP2014/066347, filed on Jun. 19, 2014.

(30) Foreign Application Priority Data

Jun. 20, 2013 (JP) .................................. 2013-129287

(51) Int. Cl.
*B60R 16/02* (2006.01)
*H02G 3/04* (2006.01)

(52) U.S. Cl.
CPC ....... *B60R 16/0215* (2013.01); *H02G 3/0418* (2013.01); *H02G 3/0468* (2013.01); *H02G 3/0487* (2013.01)

(58) Field of Classification Search
USPC .......................... 138/121; 174/50, 107, 70 R
See application file for complete search history.

(56) References Cited

U.S. PATENT DOCUMENTS

| 3,583,424 | A | * | 6/1971 | Bryant | .................... E02B 13/00 138/121 |
| 4,245,924 | A | * | 1/1981 | Fouss | .................. B29C 66/5346 138/119 |
| 5,701,707 | A | * | 12/1997 | Sorkin | ...................... E04C 5/12 52/223.13 |
| 6,752,435 | B1 | * | 6/2004 | Sorkin | .................... E01D 19/16 285/230 |

(Continued)

FOREIGN PATENT DOCUMENTS

| CN | 201247935 Y | 5/2009 |
| CN | 202772522 U | 3/2013 |

(Continued)

OTHER PUBLICATIONS

Sep. 22, 2014—International Search Report—Intl App PCT/JP2014/066347.

(Continued)

*Primary Examiner* — William H Mayo, III
*Assistant Examiner* — Krystal Robinson
(74) *Attorney, Agent, or Firm* — Banner & Witcoff, Ltd.

(57) ABSTRACT

A wire harness includes a conductive path and an exterior member with a tubular shape which covers the conductive path. The exterior member includes a straight tubular portion in which a pair of one wall and the other wall are formed, and the straight tubular portion includes a concave portion in at least the one wall, with the concave portion being positioned close to the conductive path.

12 Claims, 7 Drawing Sheets

(56) References Cited

U.S. PATENT DOCUMENTS

| | | | |
|---|---|---|---|
| 7,621,103 B1* | 11/2009 | Sorkin | E04C 5/10 |
| | | | 405/259.1 |
| 8,240,882 B2* | 8/2012 | Liao | H05K 1/021 |
| | | | 362/249.02 |
| 8,563,866 B2 | 10/2013 | Oga et al. | |
| 9,035,327 B2* | 5/2015 | Bierhuizen | H01L 25/0753 |
| | | | 257/84 |
| 2001/0011603 A1* | 8/2001 | Ueno | H01B 7/0045 |
| | | | 174/117 FF |
| 2002/0083991 A1* | 7/2002 | Sorkin | E04C 5/10 |
| | | | 138/121 |
| 2003/0183413 A1* | 10/2003 | Kato | H02G 3/32 |
| | | | 174/135 |
| 2005/0011687 A1* | 1/2005 | Yamaguchi | B60K 6/48 |
| | | | 180/65.1 |
| 2005/0045357 A1* | 3/2005 | Ichikawa | H02G 3/0431 |
| | | | 174/50 |
| 2007/0044989 A1* | 3/2007 | Nishijima | H02G 3/0468 |
| | | | 174/72 A |
| 2007/0137718 A1* | 6/2007 | Rushlander | F16L 11/08 |
| | | | 138/121 |
| 2008/0142260 A1* | 6/2008 | Yamaguchi | B60N 2/0224 |
| | | | 174/72 A |
| 2009/0044455 A1* | 2/2009 | Enomoto | B60R 16/0207 |
| | | | 49/360 |
| 2009/0116252 A1* | 5/2009 | Kille | H05K 1/0204 |
| | | | 362/373 |
| 2009/0241331 A1* | 10/2009 | Bedoe | B60R 16/0215 |
| | | | 29/825 |
| 2010/0270075 A1* | 10/2010 | Murayama | B60R 16/0207 |
| | | | 174/72 A |
| 2010/0283287 A1* | 11/2010 | Toyozumi | B60R 16/0215 |
| | | | 296/146.9 |
| 2011/0088944 A1* | 4/2011 | Ogue | B60R 16/0215 |
| | | | 174/72 A |
| 2011/0132638 A1 | 6/2011 | Oga et al. | |
| 2011/0279981 A1* | 11/2011 | Horng | H01L 23/3677 |
| | | | 361/720 |
| 2012/0305308 A1* | 12/2012 | Toyama | B60R 16/0207 |
| | | | 174/70 R |
| 2013/0112473 A1 | 5/2013 | Toyama et al. | |
| 2013/0341061 A1* | 12/2013 | Kaihotsu | H02G 3/0475 |
| | | | 174/68.3 |
| 2014/0110011 A1* | 4/2014 | Omura | H02G 3/0468 |
| | | | 138/109 |
| 2015/0251609 A1* | 9/2015 | Sugimoto | B60R 16/0215 |
| | | | 174/68.3 |
| 2015/0375696 A1* | 12/2015 | Ogue | B60R 16/0215 |
| | | | 174/68.3 |
| 2016/0163422 A1* | 6/2016 | Sugimoto | H01B 7/295 |
| | | | 174/72 A |
| 2016/0214550 A1* | 7/2016 | Oga | B60R 16/0215 |
| 2016/0322797 A1* | 11/2016 | Kimoto | H02G 3/0468 |

FOREIGN PATENT DOCUMENTS

| | | |
|---|---|---|
| DE | 063237 B | 8/1959 |
| JP | S54-143887 A | 11/1979 |
| JP | H09-046850 A | 2/1997 |
| JP | 2005-151733 A | 6/2005 |
| JP | 2007-060780 A | 3/2007 |
| JP | 2009-143326 A | 7/2009 |
| JP | 2009143326 A * | 7/2009 |
| JP | 2010-051042 A | 3/2010 |
| JP | 2012-134367 A | 7/2012 |

OTHER PUBLICATIONS

Dec. 30, 2015—(WO) IPRP—App PCT/JP2014/066347.
Feb. 23, 2017—(JP) Notification of Reasons for Refusal—App 2013-129287.
Jan. 9, 2017—(CN) The First Office Action—App 201480035419.9.
Jul. 27, 2017—(CN) The Second Office Action—App 201480035419.9.

* cited by examiner

WIRE HARNESS

CROSS REFERENCE TO RELATED APPLICATIONS

This application is a continuation of PCT application No. PCT/JP2014/066347, which was filed on Jun. 19, 2014 based on Japanese Patent Application (No. 2013-129287) filed on Jun. 20, 2013, the contents of which are incorporated herein by reference.

BACKGROUND OF THE INVENTION

1. Field of the Invention

One or more embodiments of the present invention relate to a wire harness including a conductive path and an exterior member.

2. Description of the Related Art

A wire harness disclosed in the related art electrically connects devices that are mounted in a hybrid vehicle or an electric vehicle and are driven at a high voltage.

A wire harness disclosed in below-described PTL 1 includes a plurality of conductive paths, and a corrugated tube made of resin which collectively accommodate the plurality of conductive paths and a protector made of resin. A plurality of the corrugated tubes are formed in the shape of flexible bellows, and are provided parallel to each other in a longitudinal direction of the wire harness. The protector is disposed in a region that requires restriction of a path. The protector is provided at such a position as to connect adjacent corrugated tubes together. The corrugated tube and the protector are used as exterior members.

As a harness protection member other than the corrugated tube and the protector, an exterior member with good shape holding properties, that is, a hard wire-harness protection tube has also been put into practice.

PTL 1 is JP-A-2010-51042.

SUMMARY OF THE INVENTION

In the related art, the conductive paths inside the exterior members vibrate due to vibration of a vehicle during traveling. When the conductive paths vibrate for a long period of time, the conductive paths may be damaged or the exterior members may be punctured due to friction between the conductive paths and foreign substances such as grit inside the exterior members.

One or more embodiments of the present invention are made in light of the above, and an object thereof is to provide a wire harness in which vibration of a conductive path inside an exterior member is restricted, and thus the occurrence of damage or the like can be prevented after the wire harness is attached to a vehicle.

In order to achieve this object, a wire harness in the embodiments of the present invention has characteristics in (1) to (5) hereinbelow.

(1) In a wire harness including a conductive path and an exterior member with a tubular shape which covers the conductive path, the exterior member includes a straight tubular portion in which a pair of one wall and the other wall are formed, and the straight tubular portion includes a concave portion in at least the one wall, with the concave portion being positioned close to the conductive path.

(2) In the wire harness described in (1), the exterior member is formed to have a length so as to straddle the front and the rear of a vehicle underfloor via the vehicle underfloor, and the straight tubular portion is disposed on the vehicle underfloor so that the one wall faces the ground and the other wall faces the vehicle underfloor.

(3) In the wire harness described in (1) or (2), the straight tubular portion includes a pair of support walls that are symmetrical to each other, and support the one wall and the other wall.

(4) In the wire harness described in any one of (1) to (3), the concave portion is formed over the entire length of the straight tubular portion, or is partially formed in an extension direction of the conductive path.

(5) In the wire harness described in any one of (1) to (4), at least the one wall includes a plurality of the concave portions, and is formed to have a sectional shape of concavity and convexity or a substantially corrugated sectional shape.

According to (1), the exterior member includes the straight tubular portion, and thus flexing can be restricted by the straight tubular portion. In addition, the straight tubular portion includes the concave portion, and thus vibration of the conductive path can be restricted by the concave portion. The term "restrict" implies to prevent vibration from occurring, or to reduce the amount of vibration. According to the present invention, when the exterior member is made of resin, the surface area is increased, and thus it is possible to improve cooling performance during molding.

According to (2), the straight tubular portion is disposed on the vehicle underfloor, and thus flexing at the position of the vehicle underfloor can be restricted. The straight tubular portion is disposed on the vehicle underfloor, and includes the concave portion, and thus vibration of the conductive path at the position of the vehicle underfloor can be restricted.

According to (3), the straight tubular portion includes the support walls that support the one wall and the other wall, and thus it is possible to ensure the rigidity of the straight tubular portion by the support walls.

According to (4), the concave portion is formed over the entire length of the straight tubular portion, and thus vibration of the conductive path over the entire length of the straight tubular portion can be restricted. Alternatively, the concave portion is partially formed, and thus vibration of the conductive path can be partially restricted.

According to (5), at least the one wall has a sectional shape of concavity and convexity or a substantially corrugated sectional shape, and thus it is possible to increase the rigidity of this shaped portion. Specifically, for example, it is possible to increase the rigidity of the straight tubular portion throughout its entire length (in a direction of the tube axis).

According to the present invention, the exterior member includes the straight tubular portion, and the concave portion is formed in the straight tubular portion while being positioned close to the conductive path, and thus flexing of the exterior member is restricted, and vibration of the conductive path is restricted. As a result, it is possible to prevent the occurrence of damage or the like.

The straight tubular portion is disposed on the vehicle underfloor, and thus it is possible to restrict the flexing of the exterior member, and vibration of the conductive path at the position of the vehicle underfloor. That is, it is possible to prevent the occurrence of damage or the like at the position of the vehicle underfloor.

The straight tubular portion includes the support walls, and thus it is possible to ensure rigidity by the support walls. That is, it is possible to reliably restrict the flexing of the exterior member.

The concave portion is formed to be long or is partially formed, and thus vibration of the conductive path can be restricted in a desired state.

At least the one wall is formed to have a sectional shape of concavity and convexity or a substantially corrugated sectional shape by the plurality of concave portions, and thus it is possible to increase rigidity.

DETAILED DESCRIPTION OF THE EXEMPLARY EMBODIMENTS

A wire harness includes one or a plurality of conductive paths, and an exterior member that accommodates and protects the conductive paths. The wire harness has a long length so as to pass along a vehicle underfloor. The exterior member includes a straight tubular portion in which a pair of one wall and the other wall are formed. The straight tubular portion is shaped so that the straight tubular portion includes a concave portion in at least the one wall, and the concave portion is positioned close to the conductive path.

Embodiment 1

Figure 1:
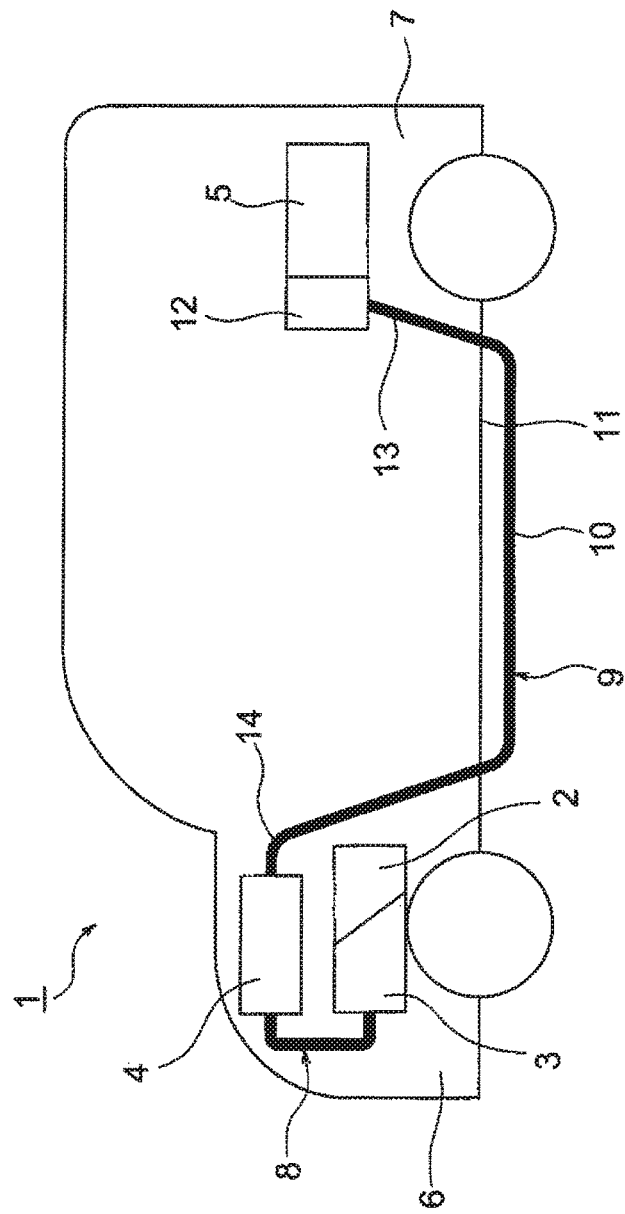
FIG. 1 is a view schematically illustrating a routing state of a wire harness in Embodiment 1 of the present invention.
Figure 2:
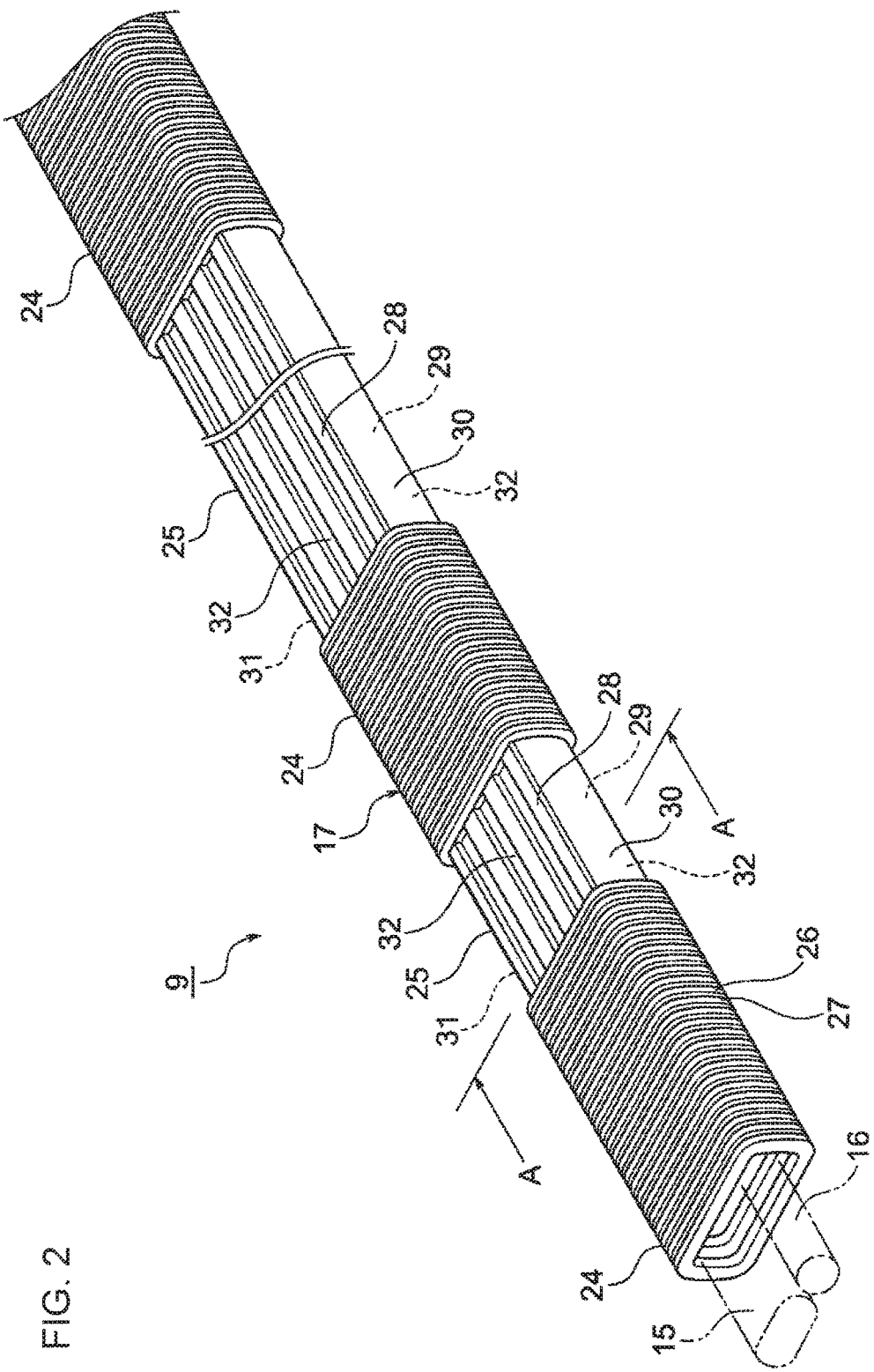
FIG. 2 is a perspective view of the wire harness.
Figure 3:
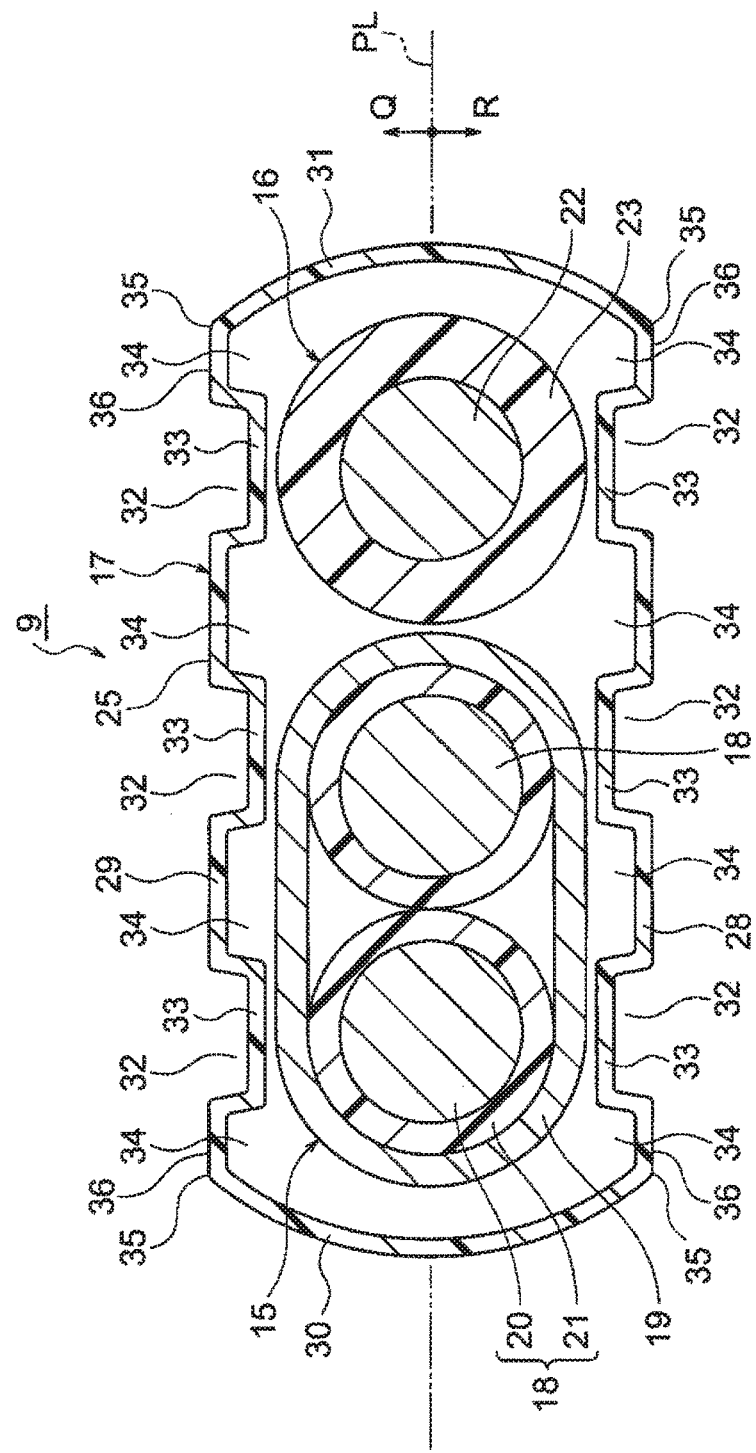
FIG. 3 is a sectional view taken along line A-A in FIG. 2.

Hereinafter, Embodiment 1 will be described with reference to the accompanying drawings. FIG. 1 is a view schematically illustrating a routing state of a wire harness of the present invention. FIG. 2 is a perspective view of the wire harness, and FIG. 3 is a sectional view taken along line A-A in FIG. 2.

In the embodiment, the present invention is applied to a wire harness to be routed in a hybrid vehicle (which may be an electric vehicle or a typical automobile).

In FIG. 1, a hybrid vehicle 1 includes two power sources, that is, an engine 2 and a motor unit 3, and is driven by a combination of power from these power sources. Electric power is supplied from a battery (battery pack) 5 to the motor unit 3 via an inverter unit 4. In the embodiment, the engine 2, the motor unit 3, and the inverter unit 4 are mounted in an engine compartment 6 in the vicinity of the front wheels. The battery 5 is mounted in a vehicle rear portion 7 in the vicinity of the rear wheels (may be mounted in a vehicle interior that is present on the rear side of the engine compartment 6).

The motor unit 3 is connected to the inverter unit 4 via a high-voltage wire harness 8. The battery 5 is connected to the inverter unit 4 via a high-voltage wire harness 9. An intermediate portion 10 of the wire harness 9 is routed on a vehicle underfloor 11. The wire harness 9 is routed along the vehicle underfloor 11 while being substantially parallel thereto. The vehicle underfloor 11 is a known body, and a so-called panel member, and a through hole is formed at a predetermined position in the vehicle underfloor 11. The wire harness 9 is water-tightly inserted into the through hole.

The wire harness 9 is connected to the battery 5 via a junction block 12 provided in the battery 5. A rear end 13 of the wire harness 9 is electrically connected to the junction block 12 by a known method. A front end 14 of the wire harness 9 is electrically connected to the inverter unit 4 by a known method.

The motor unit 3 serves as both a motor and a generator. The inverter unit 4 includes an inverter and a converter. The motor unit 3 is a motor assembly including a shielded case. The inverter unit 4 is an inverter assembly including a shielded case. The battery 5 is a Ni-MH battery or a Li-ion battery, and is built as a module. A power storage device such as a capacitor can also be used as the battery 5. Insofar as the battery 5 can be used in the hybrid vehicle 1 or an electric vehicle, the battery 5 is not limited to a specific type of battery.

In FIG. 2, the wire harness 9 includes a first conductive path (conductive path) 15; a second conductive path (conductive path) 16; an exterior member 17 that collectively accommodates and protects the first conductive path 15 and the second conductive path 16; connectors (not illustrated) that are respectively provided at ends of the first conductive path 15 and the second conductive path 16; a plurality of clamps (not illustrated) attached to an external surface of the exterior member 17; a grommet; and the like.

In FIGS. 2 and 3, the first conductive path 15 is a high-voltage conductive path, and is configured to include two high-voltage circuits 18, and a shield member 19 that covers the two high-voltage circuits 18 (this configuration is an example, and a sheath may be further provided on the outside).

The high-voltage circuit 18 is a known high-voltage electric wire, and includes a conductor 20, and an insulator 21 with which the conductor 20 is coated. The high-voltage circuits 18 are formed to have a length required for electrical connection. The high-voltage circuits 18 are formed to have a long length in order for the wire harness 9 to electrically connect the inverter unit 4 and the battery 5 (the junction block 12) together (refer to FIG. 1).

The conductor 20 is made of copper, a copper alloy, aluminum, or an aluminum alloy. The conductor 20 may have either a conductor structure in which strands are intertwined, or a conductor structure (for example, which is a conductor structure of a flat-rectangular-shaped single core or a round single core, and in this case, an electric wire also has a rod shape) with the shape of a rod having a rectangular section or a round section. The insulator 21, made of a resin material having insulating properties, is provided over an external surface of the conductor 20 using an extrusion molding method.

In the embodiment, the high-voltage circuit 18 adopts a configuration of a known high-voltage electric wire; however, the present invention is not limited to this configuration. That is, a high-voltage circuit in which an insulator is provided on a known busbar may be adopted.

The shield member 19 is an electromagnetic shield member (a shield member for counteracting electromagnetic waves) that collectively covers the two high-voltage circuits 18, and a known metallic foil having conductivity or a member including this metallic foil may be adopted as the shield member 19. The shield member 19 has substantially the same length as the entire length of the two high-voltage circuits 18. An end portion of the shield member 19 is connected to the shielded case (not illustrated) or the like of the inverter unit 4 (refer to FIG. 1) via the connector (for example, a shielded connector) (not illustrated).

Insofar as the shield member 19 is capable of counteracting electromagnetic waves, the shield member 19 may adopt the form of a known braid into which a number of strands are woven together.

As an example, other than the aforementioned configuration, the first conductive path 15 may be formed of one or a plurality of known shielded electric wires. Another example is a high-voltage coaxial composite conductive path with a configuration in which a positive circuit and a negative circuit are coaxially provided, or a high-voltage coaxial composite conductive path with a configuration in which three or more circuits are coaxially provided.

The second conductive path 16 is a known low-voltage electric wire (low-voltage conductive path), and includes a conductor 22 and an insulator 23 with which the conductor 22 is coated. The second conductive path 16 has a length required for electrical connection.

The exterior member 17 is a tube made of resin which covers the first conductive path 15 and the second conductive path 16. The exterior member 17 has a length required to allow the first conductive path 15 and the second conductive path 16 to be inserted thereinto and accommodated therein, and a thickness required to protect the first conductive path 15 and the second conductive path 16. The exterior member 17 is formed to have a long length so as to straddle the front and the rear of the vehicle underfloor 11 (refer to FIG. 1) via the vehicle underfloor 11. Insofar as the exterior member 17 includes a concave portion 32 (to be described later), the material of the exterior member 17 is not limited to resin, and may be metal.

The exterior member 17 includes a flexible tubular portion 24 that can be flexed, and a straight tubular portion 25 having rigidity higher than that of the flexible tubular portion 24, and for example, the exterior member 17 is formed in the illustrated shape. Specifically, the exterior member 17 is formed such that the flexible tubular portions 24 is continuous with the straight tubular portions 25 in an extension direction of the first conductive path 15 and the second conductive path 16. The exterior member 17 includes a plurality of the flexible tubular portions 24 and a plurality of the straight tubular portions 25, and the flexible tubular portions 24 and the straight tubular portions 25 are continuously formed while being alternately disposed. The exterior member 17 is molded of resin such that the flexible tubular portions 24 and the straight tubular portions 25 become straight when the flexible tubular portions 24 are not flexed.

The flexible tubular portions 24 are disposed and formed conforming to a vehicle attachment shape (a shape of a routing destination of the wire harness, that is, the shape of a fixation target). Specifically, the flexible tubular portions 24 are disposed and formed conforming to sections that require the bending of the exterior member 17. Each of the flexible tubular portions 24 is formed to have a length required for bending. In the embodiment, each of the flexible tubular portions 24 has a substantially rectangular section (this sectional shape is an example). The flexible tubular portions 24 are formed such that each of the flexible tubular portions 24 can be flexed at a desired angle when the wire harness 9 is packed, transported, or routed along a path in a vehicle (is attached and to the vehicle), that is, after the wire harness 9 is manufactured (not illustrated).

Each of the flexible tubular portions 24 can be flexed in a desired bent shape, and restored to an original non-flexed shape.

In the embodiment, the flexible tubular portions 24 are formed in the shape of a bellows tube (insofar as the flexible tubular portions 24 are flexible, the flexible tubular portions 24 are not limited to a specific shape). Specifically, each of the flexible tubular portions 24 includes a plurality of circumferential concave portions 26 and a plurality of circumferential convex portions 27 which are consecutively but alternately formed in a direction of the tube axis (in the extension direction of the first conductive path 15 and the second conductive path 16).

As can be understood from the aforementioned description, each of the portions, in which the flexible tubular portions 24 are disposed, is shaped like a corrugated tube. In other words, the exterior member 17 is partially shaped like a corrugated tube. The exterior member 17 has the portions shaped like a corrugated tube as described above, and thus the exterior member 17 is also referred to as a "corrugated tube", a "partially corrugated tube", or the like.

In contrast, the straight tubular portions 25 are formed as portions not being bent when the wire harness 9 is packed, transported, or routed in a path (the non-bent portion is a portion that is not actively formed to be flexible). Each of the straight tubular portions 25 is formed in the shape of a straight tube with a substantially rectangular section (this shape is an example). Each of the straight tubular portions 25 is positioned and has a length conforming to the vehicle attachment shape. Each of the straight tubular portions 25 is formed in the shape of a straight tube (in a straight tubular shape) as described above, and has rigidity, and thus the straight tubular portion 25 can be referred to as a "straight tubular portion", a "rigid portion", or the like.

Each of the straight tubular portions 25 includes one long-side wall portion (one wall) 28; the other long-side wall portion (the other wall) 29; one short-side wall portion (a support wall) 30; and the other short-side wall portion (a support wall) 31, and the straight tubular portion 25 has a substantial rectangular section as illustrated (the sectional shape is an example). The one long-side wall portion 28 is symmetrical in shape to the other long-side wall portion 29, and the one long-side wall portion 28 and the other long-side wall portion 29 are disposed to form a pair. The one short-side wall portion 30 is symmetrical in shape to the other short-side wall portion 31, and the one short-side wall portion 30 and the other short-side wall portion 31 are disposed to form a pair.

The one long-side wall portion 28 and the other long-side wall portion 29 are formed in such a way as to extend in a horizontal direction in a sectional view illustrated in FIG. 3. Actually, as illustrated in FIG. 3, the straight tubular portion 25 is disposed and formed in such a way that an upper side (the other long-side wall portion 29) of the straight tubular portion 25 faces the vehicle underfloor 11 (refer to FIG. 1), and a lower side (the one long-side wall portion 28) thereof faces the ground.

A plurality of the concave portions 32 are formed in each of the one long-side wall portion 28 and the other long-side wall portion 29. The concave portions 32 are concave in such a way that the respective internal surfaces of the one long-side wall portion 28 and the other long-side wall portion 29 are positioned close to the first conductive path 15 and the second conductive path 16. The concave portion 32 is concave (has the shape of concavity), and thus the concave portion 32 includes a bottom portion 33. The bottom portion 33 is formed as a portion that restricts vibration of the first conductive path 15 and the second conductive path 16. The term "restrict" implies to prevent vibration of the first conductive path 15 and the second conductive path 16, or to, even if vibration occurs, reduce the amount of vibration.

Each of the one long-side wall portion 28 and the other long-side wall portion 29 includes the plurality of concave portions 32, and thus the section of each has a shape of concavity and convexity (or a substantially corrugated shape) as illustrated. The sectional shape of concavity and convexity is advantageous in that flexing and bending of the straight tubular portion 25 in a direction perpendicular to the tube axis (in a vertical direction (to be described later) in the sectional view illustrated in FIG. 3) can be restricted.

The plurality of concave portions 32 are formed in each of the one long-side wall portion 28 and the other long-side wall portion 29, and thus a plurality of spaces 34 are formed. In the embodiment, each of the spaces 34 is formed to have a size which prevents the first conductive path 15 and the second conductive path 16 from falling.

The plurality of concave portions 32 are formed over the entire length of the straight tubular portion 25. The plurality of concave portions 32 are formed in at least the one long-side wall portion 28; however, the present invention is not limited to this specific configuration. The concave portion 32 formed in the one long-side wall portion 28 may not be disposed at the same illustrated position as the concave portion 32 formed in the other long-side wall portion 29. That is, when the one long-side wall portion 28 and the other long-side wall portion 29 are seen, the plurality of concave portions 32 disposed and formed therein may be disposed in a zigzag form.

The one short-side wall portion 30 and the other short-side wall portion 31 support the one long-side wall portion 28 and the other long-side wall portion 29, and are formed in such a way as to extend in a vertical direction in the sectional view illustrated in FIG. 3. The one short-side wall portion 30 and the other short-side wall portion 31 are disposed and formed in a gravitational direction (in a direction of the weight).

Each of the one short-side wall portion 30 and the other short-side wall portion 31 is formed to have a slightly bent shape so as to bulge outwards (for example, an "angle bracket" shape other than the bent shape is effective insofar as a sufficient support force can be ensured with the "angle bracket" shape). The one short-side wall portion 30 and the other short-side wall portion 31 is formed in such a way as to be able to strengthen the straight tubular portion 25 against external force from a ground side.

Edge portions 35 are respectively formed as continuous portions between the one long-side wall portion 28 and the one short-side wall portion 30, between the one long-side wall portion 28 and the other short-side wall portion 31, between the other long-side wall portion 29 and the one short-side wall portion 30, and between the other long-side wall portion 29 and the other short-side wall portion 31. The edge portion 35 is effective when the one short-side wall portion 30 and the other short-side wall portion 31 are formed to have a slightly bent shape so as to bulge outwards. That is, the edge portions 35 are advantageous in that the edge portions 35 are capable of contributing to an increase in the support force (an increase in rigidity), and the strengthening of the straight tubular portion 25. It is effective to form a flat surface portion 36 in each of the one long-side wall portion 28 and the other long-side wall portion 29 in such a way that the flat surface portions 36 is continuous with the respective edge portions 35.

When a line PL of alternating one long and two short dashes in FIG. 3 is deemed to be a parting line, and directions of arrows Q and R are deemed to represent mold parting directions, it is understood that the one short-side wall portion 30 and the other short-side wall portion 31 are shaped to have draft angles, and to provide good mold release properties. Naturally, a molding time can be reduced due to good mold release properties.

For example, when the mold release properties are not taken into consideration, the one short-side wall portion 30 and the other short-side wall portion 31 may be formed straightly along the direction perpendicular to the tube axis (along the vertical direction).

One of the plurality of straight tubular portions 25 is formed to have a long length with the one being attached to the vehicle underfloor 11 (refer to FIG. 1). The long straight tubular portion 25 is attached along a reinforcement or the like.

The wire harness 9 with the aforementioned configuration and structure is manufactured in the following manner (not illustrated). That is, the wire harness 9 is manufactured by inserting the first conductive path 15 and the second conductive path 16 into one end of the exterior member 17 up to the other end thereof with the exterior member 17 being molded of resin and substantially straight throughout its entire length. The wire harness 9 is manufactured by further attaching the clamp, the grommet, the boot, and the like to the external surface of the exterior member 17 at predetermined positions. The wire harness 9 is manufactured by further providing the connectors in end portions of the first conductive path 15 and the second conductive path 16, respectively.

After the manufacturing of the wire harness 9 is completed as described above, when the wire harness 9 is bent such that the predetermined flexible tubular portions 24 are folded, the packing of the wire harness 9 is completed. The wire harness 9 in a packed state is compact, and the wire harness 9 is transported to a vehicle assembly site in such a compact state.

At the vehicle assembly site, the attachment of the wire harness 9 to the vehicle starts with the long portions of the wire harness 9 corresponding to the vehicle underfloor 11 (refer to FIG. 1). The straight tubular portions 25 of the exterior member 17 are disposed in the long portions of the wire harness 9 corresponding to the vehicle underfloor 11, and thus the attachment of the wire harness 9 is performed in a state where flexing of the wire harness 9 is restricted. In this case, the attachment of the wire harness 9 is performed with excellent workability. After the long portions of the wire harness 9 corresponding to the vehicle underfloor 11 are fixed using the clamps and the like, the remainders of the wire harness 9 are attached while the flexible tubular portions 24 of the exterior member 17 are flexed (bent). When a series of attachment operations are completed, the wire harness 9 is routed in a desired path.

As has been described with reference to FIGS. 1 to 3, the wire harness 9 according to the embodiment of the present invention is configured to include the first conductive path (conductive path) 15; the second conductive path (conductive path) 16; and the exterior member 17 that covers the first conductive path 15 and the second conductive path 16. The exterior member 17 adopts a structure in which the flexible tubular portions 24 and the straight tubular portions 25 are continuous with each other in the extension direction of the first conductive path 15 and the second conductive path 16. Since the straight tubular portion 25 has rigidity, and each of the one long-side wall portion 28 and the other long-side wall portion 29 includes the plurality of concave portions 32, an internal space is reduced. Therefore, it is possible to restrict vibration of the first conductive path 15 and the second conductive path 16. As a result, it is possible to prevent the occurrence of damage or the like.

The straight tubular portions 25 of the wire harness 9 are disposed on the vehicle underfloor 11, and thus it is possible to restrict the flexing of the exterior member 17 at the position of the vehicle underfloor 11, and to restrict vibration of the first conductive path 15 and the second conductive path 16. As a result, it is possible to prevent the occurrence of damage or the like.

The wire harness 9 includes the one short-side wall portion 30 and the other short-side wall portion 31 as support walls, and thus it is possible to ensure rigidity, and to reliably restrict the flexing of the exterior member 17. Naturally, a sectional shape of concavity and convexity (or a substantially corrugated sectional shape) is also effective in that flexing of the exterior member 17 is restricted.

Embodiment 2

Figure 4:
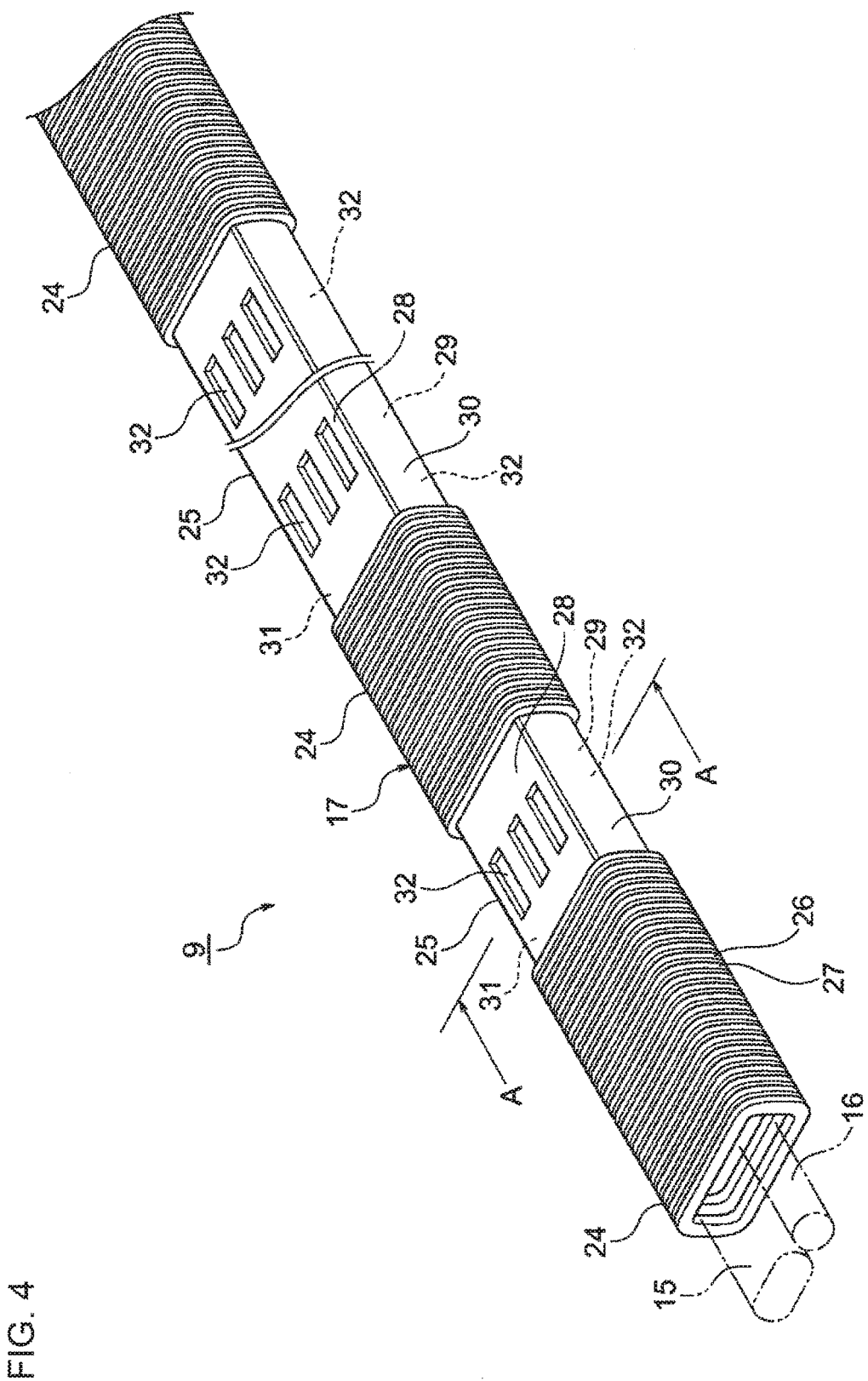
FIG. 4 is a perspective view of a wire harness in Embodiment 2 of the present invention.

Hereinafter, Embodiment 2 will be described with reference to the accompanying drawing. FIG. 4 is a perspective view of a wire harness as a modification example. The same reference signs are assigned to the same configuration members as in Embodiment 1, and detailed description thereof will be omitted.

In FIG. 4, similar to Embodiment 1, the exterior member 17 includes the flexible tubular portions 24 that can be flexed, and the straight tubular portions 25 having rigidity higher than that of the flexible tubular portions 24. The straight tubular portion 25 includes the one long-side wall portion 28; the other long-side wall portion 29; the one short-side wall portion 30; and the other short-side wall portion 31.

The plurality of concave portions 32 are formed in each of the one long-side wall portion 28 and the other long-side wall portion 29. In the embodiment, the plurality of concave portions 32 are partially disposed and formed. That is, the plurality of concave portions 32 are not disposed and formed over the entire length of the straight tubular portion 25 as in Embodiment 1, but are partially disposed and formed in the extension direction of the first conductive path 15 and the second conductive path 16. The plurality of concave portions 32 are disposed and formed at positions in which it is desirable to restrict vibration of the first conductive path 15 and the second conductive path 16 (a sectional view taken along line A-A is the same as FIG. 3).

In Embodiment 2, naturally, it is possible to prevent the occurrence of damage or the like by restricting the flexing of the exterior member 17 and vibration of the first conductive path 15 and the second conductive path 16.

Embodiment 3

Figure 5:
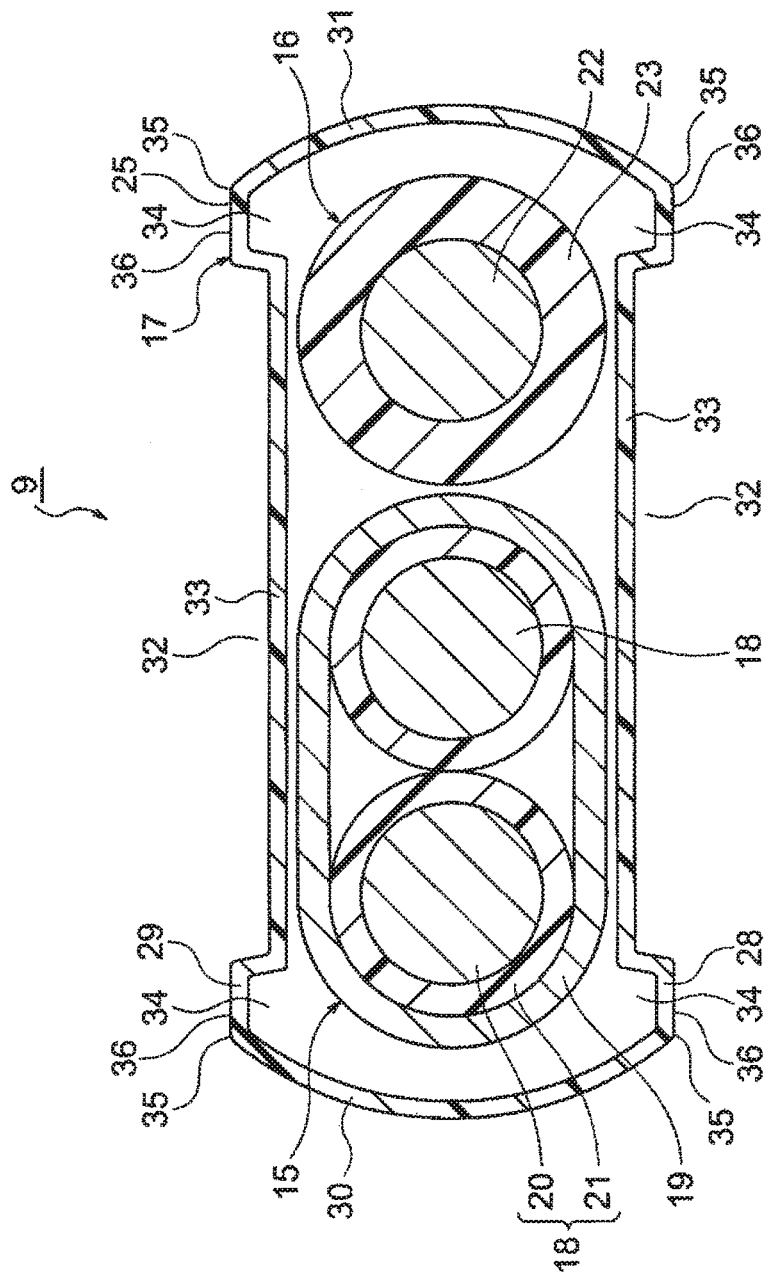
FIG. 5 is a sectional view of a wire harness in Embodiment 3 of the present invention.

Hereinafter, Embodiment 3 will be described with reference to the accompanying drawing. FIG. 5 is a sectional view of a wire harness as a modification example. The same reference signs are assigned to the same configuration members as in Embodiments 1 and 2, and detailed description thereof will be omitted.

In FIG. 5, similar to Embodiments 1 and 2, the exterior member 17 in Embodiment 3 includes the straight tubular portion 25. In the straight tubular portion 25, one concave portion 32 is formed in each of the one long-side wall portion 28 and the other long-side wall portion 29. Each of the concave portions 32 is formed to have a large width. In the embodiment, the straight tubular portion 25 is formed to a rectangular shape such that the section of the straight tubular portion 25 has a substantially H shape due to the concave portions 32.

In Embodiment 3, naturally, it is possible to prevent the occurrence of damage or the like by restricting the flexing of the exterior member 17 and vibration of the first conductive path 15 and the second conductive path 16.

Embodiment 4

Figure 6:
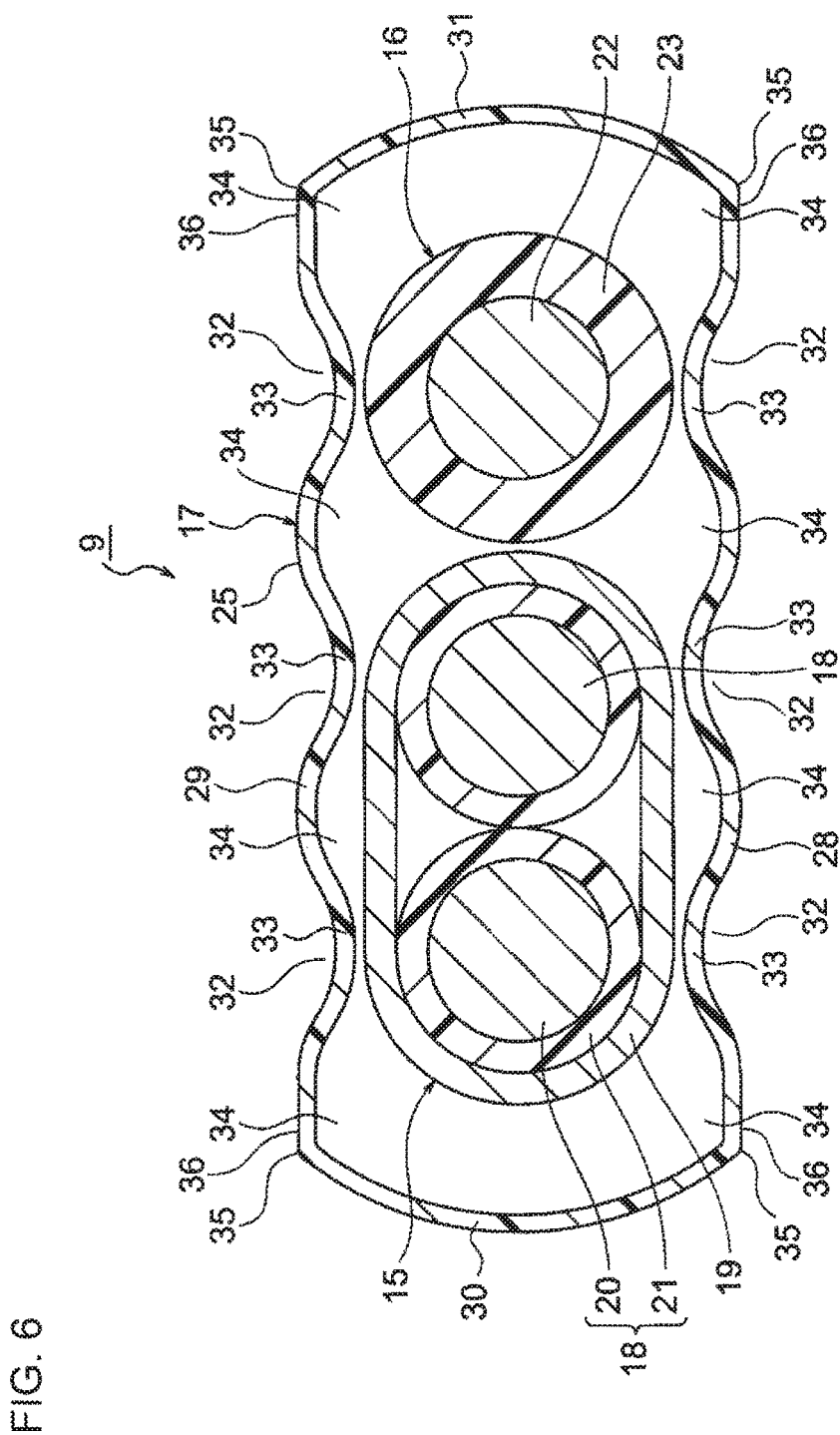
FIG. 6 is a sectional view of a wire harness in Embodiment 4 of the present invention.

Hereinafter, Embodiment 4 will be described with reference to the accompanying drawing. FIG. 6 is a sectional view of a wire harness as a modification example. The same reference signs are assigned to the same configuration members as in Embodiments 1 to 3, and detailed descriptions thereof will be omitted.

In FIG. 6, similar to Embodiments 1 to 3, the exterior member 17 in Embodiment 4 includes the straight tubular portion 25. The straight tubular portion 25 includes the one long-side wall portion 28; the other long-side wall portion 29; the one short-side wall portion 30; and the other short-side wall portion 31. The plurality of concave portions 32 are formed in each of the one long-side wall portion 28 and the other long-side wall portion 29. In the embodiment, the one long-side wall portion 28 and the other long-side wall portion 29 are formed in the shape of a corrugated plate having a section further corrugated than in Embodiment 1 due to the plurality of concave portions 32 with many curved surfaces.

Similar to Embodiment 1, each of the one short-side wall portion 30 and the other short-side wall portion 31 is formed to have a slightly bent shape so as to bulge outwards. The edge portion 35 and the flat surface portion 36 are formed similar to Embodiment 1.

In Embodiment 4, naturally, it is possible to prevent the occurrence of damage or the like by restricting the flexing of the exterior member 17 and vibration of the first conductive path 15 and the second conductive path 16.

Embodiment 5

Hereinafter, Embodiment 5 will be described with reference to the accompanying drawings. FIGS. 7(*a*) and 7(*b*) are sectional views of wire harnesses as modification examples. The same reference signs are assigned to the same configuration members as in Embodiment 1, and detailed descriptions thereof will be omitted.

In Embodiment 5, the wire harness 9 is configured to include the first conductive path 15 that is a high-voltage conductive path; the exterior member 17 that accommodates and protects the first conductive path 15; a connector (not illustrated) provided at an end of the first conductive path 15; a plurality of clamps (not illustrated) attached to the external surface of the exterior member 17; a grommet; and the like. In Embodiment 5, the exterior member 17 is formed to have a small width to the extent that the wire harness 9 is configured to not include the second conductive path 16 (refer to FIG. 3) in Embodiment 1.

Figure 7A:
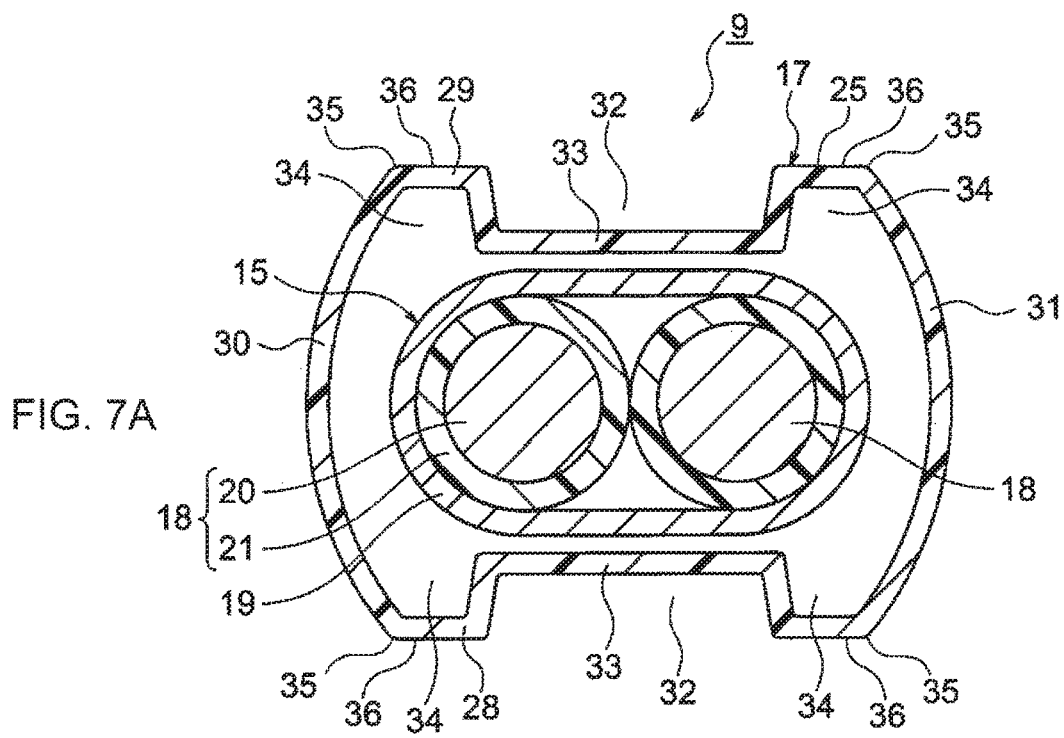
FIGS. 7A and 7B illustrate sectional views of wire harnesses in Embodiment 5 of the present invention.

In FIG. 7A, the exterior member 17 in Embodiment 5 includes the straight tubular portion 25. In the straight tubular portion 25, one concave portion 32 is formed in each of the one long-side wall portion 28 and the other long-side wall portion 29. In the embodiment, the straight tubular portion 25 is formed to have a rectangular shape such that the section of the straight tubular portion 25 has a substantially H shape due to the concave portions 32.

Figure 7B:
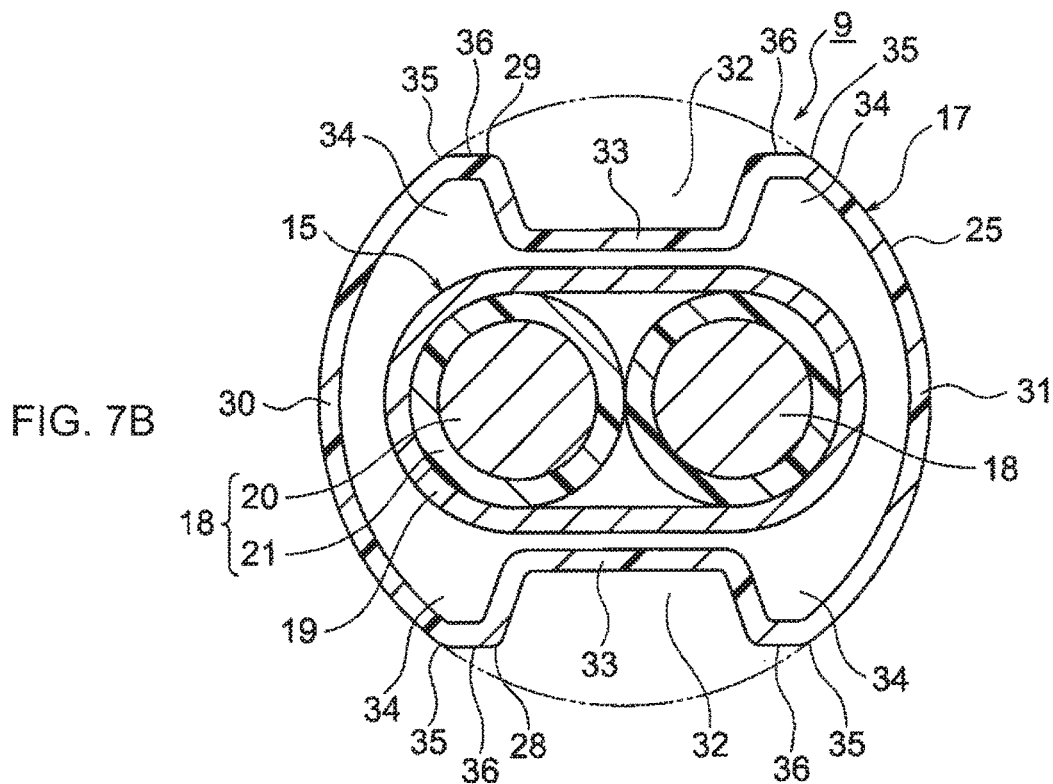

The concave portions 32 may be formed based on the straight tubular portion 25 with a circular section as illustrated in FIG. 7B. That is, the straight tubular portion 25 with the circular section includes the one long-side wall portion 28 and the other long-side wall portion 29, and each of the concave portions 32 is formed in the one long-side wall portion 28 and the other long-side wall portion 29.

Examples of the sectional shapes of the straight tubular portion 25 to be based on include a rectangular shape, a circular shape, a long circular shape, and an elliptical shape and the like.

In Embodiment 5, naturally, it is possible to prevent the occurrence of damage or the like by restricting the flexing of the exterior member 17 and vibration of the first conductive path 15.

The characteristics of the wire harness in the embodiments of the present invention are collectively and briefly listed in [1] to [5] hereinbelow.

[1] In a wire harness (9) including conductive paths (15 and 16) and an exterior member (17) with a tubular shape which covers the conductive paths (15 and 16), the exterior member (17) includes a straight tubular portion (25) in which a pair of one wall (28) and the other wall (29) are formed, and the straight tubular portion (25) includes a concave portion (32) in at least the one wall (28), with the concave portion (32) being positioned close to the conductive paths (15 and 16).

[2] In the wire harness (9) described in [1], the exterior member (17) is formed to have a length so as to straddle the front and the rear of a vehicle underfloor (11) via the vehicle underfloor (11), and the straight tubular portion (25) is disposed on the vehicle underfloor (11) so that the one wall (28) faces the ground, and the other wall (29) faces the vehicle underfloor (11).

[3] In the wire harness (9) described in [1] or [2], the straight tubular portion (25) includes a pair of support walls (30 and 31) that are symmetrical to each other, and support the one wall (28) and the other wall (29).

[4] In the wire harness (9) described in any one of [1] to [3], the concave portion (32) is formed over the entire length of the straight tubular portion (25), or is partially formed in an extension direction of the conductive paths (15 and 16).

[5] In the wire harness (9) described in any one of [1] to [4], at least the one wall (28) includes a plurality of the concave portions (32), and is formed to have a sectional shape of concavity and convexity or a substantially corrugated sectional shape.

The present invention has been described in detail with reference to the specific embodiment, and it becomes apparent to persons skilled in the art that modifications or corrections can be made to the present invention in various forms insofar as the modifications or the corrections do not depart from the spirit and the scope of the present invention.

It is possible to provide a wire harness in which vibration of a conductive path inside an exterior member is restricted, and thus the occurrence of damage or the like can be prevented after the wire harness is attached to a vehicle, which is the effect of the present invention. The present invention with such an effect is effectively applied to a wire harness that is configured to include a conductive path and an exterior member.

What is claimed is:

1. A wire harness comprising:
   a conductive path extending in a longitudinal direction;
   at least one electric wire disposed within the conductive path; and
   an exterior member with a tubular shape which covers the conductive path,
   wherein the exterior member includes:
      a first tubular portion extending in the longitudinal direction and in which a first wall and a second wall are formed, the first wall and the second wall extending in a first direction orthogonal to the longitudinal direction and defining an interior region of the first tubular portion, the first tubular portion having a non-concave portion and a concave portion along a cross-section of at least the first wall, the cross-section being orthogonal to the longitudinal direction, the concave portion being recessed into the interior region, and
      a second tubular portion extending in the longitudinal direction and provided adjacent to the first tubular portion in the longitudinal direction, the second tubular portion being configured to be more flexible than the first tubular portion,
   wherein a first distance between the concave portion of the first tubular portion and the conductive path is less than a second distance between the non-concave portion of the first tubular portion and the conductive path,
   wherein the electric wire is arranged between the first wall and the second wall at a location, in the first direction, where the concave portion of the first tubular portion is provided, and
   wherein a point of maximum concavity of the concave portion is aligned with a conductor of the electric wire in a second direction perpendicular to the first direction and the longitudinal direction.

2. The wire harness according to claim 1, wherein:
   the exterior member is formed to have a length so as to straddle a front and a rear of a vehicle underfloor via the vehicle underfloor, and
   the first tubular portion is disposed on the vehicle underfloor so that the first wall faces away from the vehicle underfloor and the second wall faces the vehicle underfloor.

3. The wire harness according to claim 1,
   wherein the first tubular portion includes a pair of support walls that are symmetrical to each other and support the first wall and the second wall.

4. The wire harness according to claim 3, wherein the first and second walls extend in a horizontal direction in a cross sectional view perpendicular to the longitudinal direction, and the pair of support walls extend in a vertical direction in the cross sectional view.

5. The wire harness according to claim 1,
   wherein the concave portion of the first tubular portion is continuously formed over the entire length of the first tubular portion.

6. The wire harness according to claim 1,
   wherein at least the first wall includes a plurality of the concave portions along the first direction, and is formed to have a sectional shape of concavity and convexity or a substantially corrugated sectional shape.

7. The wire harness according to claim 1, wherein the wire harness includes a plurality of conductive paths arranged in the first direction, and
   wherein the first wall and the second wall oppose one another in a second direction orthogonal to the longitudinal direction and the first direction.

8. The wire harness according to claim 1, wherein the exterior member is made of resin.

9. The wire harness according to claim 1, wherein the second tube portion includes a plurality of concave portions extending in the first direction, the concave portions being separated by non-concave portions in the longitudinal direction.

10. The wire harness according to claim 1, wherein the first tubular portion and the second tubular portion are arranged in an alternating manner.

11. The wire harness according to claim 1, wherein the exterior member is configured as a one-piece structure.

12. The wire harness according to claim 1, wherein a distance, in the second direction, between the first wall and the second wall at the concave portion, is less than a distance, in the second direction, between the first wall and the second wall at the non-concave portion.

* * * * *